United States Patent Office 2,821,812
Patented Feb. 4, 1958

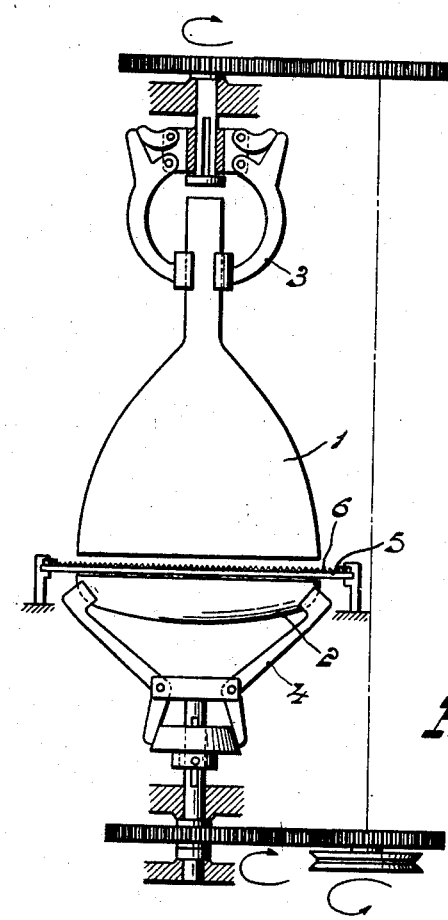
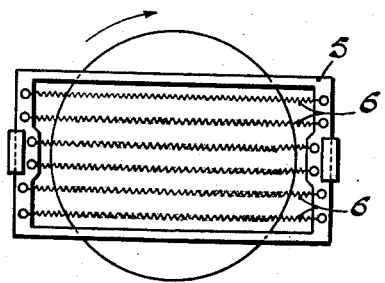

2,821,812

METHOD OF SEALING TOGETHER THICK-WALLED HOLLOW GLASS PARTS

Henricus Gerbrand Pieter Vermaas, Eindhoven, Netherlands, and Otto Louis Van Steenis, deceased, late of Eindhoven, Netherlands, by Joris Daniel Heijligers, executor, Eindhoven, Netherlands, assignors, by mesne assignments, to North American Philips Company, Inc., New York, N. Y., a corporation of Delaware Application April 14, 1954, Serial No. 423,124

Claims priority, application Netherlands May 11, 1953

2 Claims. (Cl. 49—82)

This invention relates to a method of sealing together thick-walled hollow glass articles, more especially the glass window and cone of a cathode-ray tube.

When sealing thick-walled and usually large glass parts, they are usually arranged with the sealing edges opposite each other and preheated by means of flames playing over them until they are sufficiently hot, after which the sealing edges themselves are strongly heated and melted together.

It is found that poor seals leading to rejects are a maximum about during the first half of the preheating period, because the glass parts, more particularly the cone and the window of a cathode-ray tube, are very liable to cracking during said period. If the preheating operation occurs in an oven or by means of hot air, said phenomenon persists.

Extensive researches have revealed that this is to be ascribed to poor thermal conduction of the glass in the cold state, while at comparatively low temperatures the thermal spreading in the glass due to thermal radiation is insignificant. At the beginning of the preheating period a considerable temperature gradient consequently occurs from the outside to the inside in the wall, thus creating high stresses in the glass. When the glass becomes hotter said gradient decreases since the thermal radiation in the glass is reflected and absorbed so that the thermal conduction apparently increases.

The afore-said inconvenience can be obviated practically entirely if, in accordance with the invention, in a method of sealing together thick-walled hollow glass parts, more particularly the glass window and cone of a cathode-ray tube, while preheating said parts which are slightly spaced apart opposite each other, a heating element is disposed for some time between said edges during the preheating operation and the edges, after removing the heating element, are subsequently further heated and sealed together.

It is, in general, sufficient to hold the heating element for some time, about half the length of the preheating period, between the edges to be sealed. Said heating element may be a glow or infra-red heating plate or a flat frame on which heating spirals are stretched. Since the glass parts usually rotate during the heating operation, the heating element need not be as large as said glass parts but may, if desired, consist of one or more rods that are maintained between the rotating edges. Owing to the heat from this heating element, the glass sealing edges and part of the remaining wall of the glass parts are internally heated more rapidly with the result that the temperature gradient greatly decreases from the outside to the inside.

This is of particular importance during the first part of the preheating period when the temperature of the glass wall externally increases from room or ambient temperature to 350 degrees centigrade. At higher temperatures the absorption of the thermal radiation is such that the wall is also internally heated sufficiently.

In order that the invention may be readily carried into effect, it will now be described with reference to the accompanying drawing, given by way of example, in which:

Fig. 1 is a side view and

Fig. 2 is a plan view of a bulb and a window for a cathode-ray tube during the heating period, in accordance with the invention.

In the drawing, the reference numeral 1 denotes the cone of a cathode-ray tube which is to be sealed to a window 2. The cone 1 and the window 2 are held by members 3 and 4, for example forming part of a rotary sealing machine having twelve operating positions. In the first five operating positions, the cone and the window are preheated. In such machines this is mostly done by means of flames encircling the rotating glass parts. As an alternative, however, said parts may be passed through an oven. Cracking is found to occur mostly in the second to the fourth operating position. Therefore, in accordance with the invention, a radiant heating element 5, which may be stationary, is provided at one or more of said positions. Since the glass parts are held to be slightly spaced apart at the sealing edges, the heating element can be disposed between them without additional means. This element 5 heats the hollow glass parts 1 and 2 internally with the result that the temperature gradient decreases in the glass wall.

The heating element may be in the form of a frame 5 carrying heating spirals 6. Alternatively, the heating element may be of any desired different form as is fundamentally known in heating plate constructions since constantly even heating is obtained, owing to rotation of the glass part. If desired the heating element 5 may consist of a plate which is strongly preheated by means of flames or the like.

The five preheating positions are followed, for example, by two sealing positions and four cooling positions. In the former supply conductors may be sealed into the glass wall, the twelfth position being available for removing the sealed article and the provision of other parts to be sealed. In this case the glass parts remain approximately one minute in each operating position.

The invention is of particular importance if the wall-thickness of the glass parts, especially of the edges to be sealed together, is in excess of 2.5 mm.

Although only one embodiment has been described, the invention applies, in general, whenever thick-walled, hollow glass parts are to be sealed together with a limited possibility of heating.

What is claimed is:

1. A method of sealing together a pair of thick-walled, hollow, glass members, which comprises spacing said members slightly apart and opposite one another, placing a radiant heating element which is larger at least in one direction than said members between the members, radiantly heating the inside of said members while preheating the members from ambient to a higher predetermined temperature, thereafter removing the heating element, and thereafter further heating the edges of said glass members and sealing the members together along their heated edges.

2. A method of sealing together a pair of thick-walled, hollow, glass members, which comprises spacing said members slightly apart and opposite one another, placing a radiant heating element which is larger at least in one direction than said members between the members, radiantly heating the inside of said members while rotating the members and preheating the outside of the members from ambient to a higher predetermined temperature, thereafter removing the heating element, and thereafter further heating the edges of said glass members until they soften and sealing the members together along their heated edges.

References Cited in the file of this patent

UNITED STATES PATENTS

| | | |
|---|---|---|
| 2,034,925 | Slayter et al. | Mar. 24, 1936 |
| 2,191,953 | Blau | Feb. 27, 1940 |
| 2,261,011 | Wiley | Oct. 28, 1941 |

FOREIGN PATENTS

| | | |
|---|---|---|
| 536,858 | Great Britain | May 29, 1941 |